United States Patent
Lee

(10) Patent No.: US 12,374,752 B2
(45) Date of Patent: Jul. 29, 2025

(54) BATTERY PACK

(71) Applicant: SK On Co., Ltd., Seoul (KR)

(72) Inventor: Seung Hun Lee, Daejeon (KR)

(73) Assignee: SK ON CO., LTD., Seoul (KR)

( * ) Notice: Subject to any disclaimer, the term of this patent is extended or adjusted under 35 U.S.C. 154(b) by 745 days.

(21) Appl. No.: 17/665,213

(22) Filed: Feb. 4, 2022

(65) Prior Publication Data

US 2022/0255185 A1    Aug. 11, 2022

(30) Foreign Application Priority Data

Feb. 8, 2021 (KR) ........................ 10-2021-0017770

(51) Int. Cl.
*H01M 50/367* (2021.01)
*H01M 50/30* (2021.01)

(52) U.S. Cl.
CPC ........ *H01M 50/367* (2021.01); *H01M 50/394* (2021.01)

(58) Field of Classification Search
CPC .......................... H01M 50/367; H01M 50/394
See application file for complete search history.

(56) References Cited

U.S. PATENT DOCUMENTS

| | | | |
|---|---|---|---|
| 1,329,559 A | 2/1920 | Tesla | |
| 9,627,663 B2 * | 4/2017 | Kim | H01M 50/367 |
| 11,296,381 B2 * | 4/2022 | Miler | H01M 10/613 |
| 2013/0143081 A1 | 6/2013 | Watanabe et al. | |
| 2014/0322566 A1 | 10/2014 | Kim | |
| 2019/0088914 A1 | 3/2019 | Choi et al. | |
| 2021/0066690 A1 | 3/2021 | Gondoh | |
| 2021/0359374 A1 | 11/2021 | Reinprecht et al. | |

FOREIGN PATENT DOCUMENTS

| | | | | |
|---|---|---|---|---|
| CN | 112331992 A | | 2/2021 | |
| DE | 102015014558 A1 | * | 5/2017 | .......... H01M 50/308 |
| EP | 3890056 A1 | | 10/2021 | |
| EP | 3910699 A1 | | 11/2021 | |
| EP | 3926747 A1 | | 12/2021 | |

(Continued)

OTHER PUBLICATIONS

Translated version of DE102015014558A1.*

(Continued)

*Primary Examiner* — Barbara L Gilliam
*Assistant Examiner* — Jade Serena Simmons
(74) *Attorney, Agent, or Firm* — IP & T GROUP LLP

(57) ABSTRACT

A battery pack includes a battery module including a module housing and a plurality of battery cells accommodated in the module housing; a pack housing accommodating a plurality of battery modules therein and having at least one venting hole for discharging gas externally from the pack housing; a transverse member installed in the pack housing and disposed in a direction, intersecting an internal space of the pack housing; and a flow guide member disposed in an internal space of the transverse member in a longitudinal direction of the transverse member, and configured to guide gas introduced from a transverse portion connection hole in the transverse member, to form a first gas flow with directionality in the longitudinal direction of the transverse member.

20 Claims, 9 Drawing Sheets

(56) References Cited

FOREIGN PATENT DOCUMENTS

| KR | 10-2014-0127743 A | 11/2014 |
| KR | 10-2019-0031835 A | 3/2019 |
| KR | 10-2020-0110081 A | 9/2020 |
| KR | 10-2021-0139167 A | 11/2021 |
| WO | 2018/023050 A1 | 2/2018 |
| WO | 2019/176415 A1 | 9/2019 |

OTHER PUBLICATIONS

Extended European Search Report for the European Patent Application No. 22154615.3 issued by the European Patent Office on Jan. 2, 2023.
Office Action for Korean Patent Application No. 10-2021-0017770 issued by the Korean Patent Office on Nov. 20, 2024.
Notice of Allowance (=Notification to Grant Patent Right for Invention) for Korean Patent Application No. 10-2021-0017770 issued by the Korean Patent Office on Jun. 12, 2025.

* cited by examiner

BACKGROUND ART

BACKGROUND ART

FORWARD FLOW
REVERSE FLOW

III-III'

BATTERY PACK

CROSS-REFERENCE TO RELATED APPLICATION(S)

This application claims benefit of priority to Korean Patent Application No. 10-2021-0017770 filed on Feb. 8, 2021 in the Korean Intellectual Property Office, the disclosure of which is incorporated herein by reference in its entirety.

BACKGROUND

1. Field

The present disclosure relates to a battery pack including a plurality of battery modules, and including a venting hole for discharging gas generated in an internal space of a pack housing externally.

2. Description of Related Art

Unlike primary batteries, secondary batteries may charge and discharge electricity, to be applied to various fields such as digital cameras, mobile phones, notebook computers, hybrid vehicles, and electric vehicles. Examples of such secondary batteries include a nickel-cadmium battery, a nickel-metal hydride battery, a nickel-hydrogen battery, a lithium secondary battery, and the like.

Among the secondary batteries, significant research into lithium secondary batteries having a high energy density and a high discharge voltage is in progress. Recently, lithium secondary batteries have been manufactured and used as a pouch-type battery cell having flexibility, or a prismatic or cylindrical can-type battery cell having rigidity.

In addition, secondary batteries are widely used not only in small-sized devices such as portable electronic devices, but also in medium and large-sized devices such as vehicles and power storage devices. A large number of secondary batteries may be electrically connected to each other, and may be used to increase overall capacity and output of the battery in such medium and large-sized devices. To this end, in the medium and large-sized devices, a plurality of battery cells may be modularized to form a battery module, and the battery module may be installed and used as a plurality of battery modules in a battery pack.

Various standards may be required for a battery pack, with one representative standard being safety. In particular, safety of a battery pack mounted on a vehicle may be very important because it may be directly related to the life of a vehicle occupant.

One important issue related to the safety of a battery pack is to prevent or reduce occurrence of an ignition in the battery pack. However, even if an ignition occurs, it is necessary to suppress the ignition.

Meanwhile, a battery pack may be equipped with a plurality of battery cells composed for example of a lithium secondary battery or the like. When various events occur, such as when a battery cell is nearing end of a lifespan thereof, when a swelling phenomenon of a battery cell occurs, when a battery cell is overcharged, when a battery cell is exposed to heat, when a sharp object such as a nail penetrates a casing of a battery cell, when an external shock is applied to a battery cell, or when other related event occurs, electrolyte gas may leak out of the battery cell. In particular, in a high-capacity pouch-type lithium secondary battery, there may be an issue in that a large amount of electrolyte gas is exposed to the ambient from a sealing portion of a pouch (a casing) when the above-described events occur. In order to discharge electrolyte gas generated in an internal space of the battery pack to an external space of the battery pack, a venting hole (a venting portion, a gas exhaust port, or a gas passage port) may be installed in a wall surface of a pack housing. Since a venting hole functions to discharge gas generated in a battery pack externally, the venting hole may be also used for the purpose of delaying thermal propagation.

FIGS. 1 and 2 illustrate a battery pack 10 according to the conventional practice having a venting hole HV in order to discharge gas generated in the battery pack externally. Referring to FIGS. 1 and 2, a battery pack 10 according to this practice may accommodate a battery module 11 including a plurality of battery cells 12 in an internal space S1 of a pack housing 13. The battery module 11 may be configured to be disposed between transverse members 14 intersecting the internal space S1 of the battery pack 10. Electrolyte gas generated in the battery module 11 and/or gas generated by flame may flow into an internal space S2 of the transverse member 14 through a module portion discharge hole H1 formed in the battery module 11 and a transverse portion connection hole H2 formed in the transverse member 14.

However, in the battery pack 10 according to this practice, even if gas generated in the battery pack 10 flows into the internal space S2 of the transverse member 14, the gas may stay in the internal space S2 of the transverse member 14 without being discharged quickly to ambient through a transverse portion discharge hole H5 and/or a venting hole HV may permit. Accordingly, since the battery pack 10 according to this practice may increase a temperature and/or a pressure in the battery pack 10 due to discharge delay of the gas, there may be the possibility of the occurrence of secondary events such as an occurrence of an explosion or a large flame increases.

SUMMARY

One aspect of the present disclosure is to provide a battery pack discharging gas generated in the battery pack externally to ambient, to prevent or reduce an increase in temperature and/or pressure in the battery pack and delay thermal propagation in the battery pack.

Another aspect of the present disclosure is to provide a battery pack increasing space utilization of the battery pack, when a structure discharging gas in the battery pack is used.

Another aspect of the present disclosure is to provide a battery pack increasing a degree of design freedom, such as an installation position of a venting hole or the like.

According to one aspect of the present disclosure, a battery pack includes a battery module including a module housing and a plurality of battery cells accommodated in the module housing; a pack housing accommodating a plurality of battery module therein and having at least one venting hole for discharging gas externally from the pack housing; a transverse member installed in the pack housing and disposed in a direction, intersecting an internal space of the pack housing; and a flow guide member disposed in an internal space of the transverse member in a longitudinal direction of the transverse member, and configured to guide gas introduced from a transverse portion connection hole in the transverse member, to form a first gas flow with directionality in the longitudinal direction of the transverse member.

In this case, a module portion discharge hole corresponding to the transverse portion connection hole may be disposed in the module housing, a flow portion inlet hole corresponding to the transverse portion connection hole may be disposed in the flow guide member, a flow portion discharge hole corresponding to the at least one venting hole is disposed in the flow guide member, and the gas generated in the module housing may be discharged to the at least one venting hole through the flow guide member.

In addition, the flow guide member may be configured to guide gas introduced from the flow portion inlet hole, to form the first gas flow with directionality in one direction toward the flow portion discharge hole. In this case, the flow portion discharge hole may be disposed at one end of the flow guide member in a longitudinal direction thereof.

The flow portion discharge hole may comprises plural opposing flow portion discharge holes respectively formed at both opposing ends of the flow guide member in a longitudinal direction thereof, the flow guide member may be configured to guide second gas flow introduced from the flow portion inlet hole, to form third and fourth gas flows with directionalities in both directions toward the opposing flow portion discharge holes, and the second gas flow introduced from the flow portion inlet hole may be discharged through at least one of the opposing flow portion discharge holes. In this case, one side portion of the flow guide member in a longitudinal direction may be configured to guide the second gas flow introduced from the flow portion inlet hole, to form the third gas flow with directionality in a direction toward one of the opposing flow portion discharge holes formed at one end of the flow guide member in a longitudinal direction thereof, and the other side portion of the flow guide member in the longitudinal direction may be configured to guide the second gas flow introduced from the flow portion inlet hole, to form the fourth gas flow with directionality in a direction toward the other one of the opposing flow portion discharge holes formed at the other end of the flow guide member in the longitudinal direction.

In addition, the at least one venting hole may be formed in a position corresponding to an end portion of the transverse member in a longitudinal direction thereof. In this case, a transverse portion discharge hole may be disposed in a position of the transverse member corresponding to the at least one venting hole.

Further, the flow guide member may be configured such that a first flow resistance for gas introduced from the flow portion inlet hole in a first direction from one portion of the flow guide member toward another portion of the flow guide member is less than a second flow resistance for gas introduced from the flow portion inlet hole in a second direction from the other portion of the flow guide member toward the one portion of the flow guide member.

In addition, the flow guide member may have a main flow path formed in a central portion thereof, and the flow guide member may include a) a flow guide portion configured to guide gas flowing in a first direction from one portion of the flow guide member toward another portion of the flow guide member, to thereby flow through the main flow path, and b) a flow obstruction portion restricting gas from flowing in a second direction opposite to the first direction from the other portion of the flow guide member toward the one portion of the flow guide member. In this case, the flow guide member further may include a partition wall, the partition wall configured to guide the gas flowing in the first direction of the flow guide member into the main flow path, and configured to guide the gas flowing in the second direction of the flow guide member into the flow obstruction portion.

Further, the flow portion inlet hole may be inclined toward the first direction.

In addition, each of the plurality of battery modules are installed on both sides in a width direction of at least one of the transverse members, the transverse portion connection hole may be respectively disposed on both sides of the transverse member in the width direction of the transverse member, and the flow portion inlet hole may correspond to the transverse portion connection hole.

Further, the transverse member may support the module housing, and the module housing may include an extension portion extending toward the transverse member, the extension portion being supported by an upper surface of the transverse member.

According to one aspect of the present disclosure, a battery pack includes a battery module including a module housing and a plurality of battery cells accommodated in the module housing; a pack housing accommodating a plurality of battery modules therein and having at least one vent hole for discharging gas externally from the pack housing; and a transverse member installed in the pack housing and disposed in a direction intersecting an internal space of the pack housing, wherein the transverse member comprises means for guiding gas preferentially in a downstream gas flow direction inside the transverse member toward the at least one vent hole.

The means for guiding gas preferentially in a downstream gas flow direction may comprise: a flow guide portion configured to guide the gas in the downstream gas flow direction and a flow obstruction portion restricting gas from flowing opposite the downstream gas flow direction.

The means for guiding gas preferentially in a downstream gas flow direction may comprise: at least one vortex-generating structure resisting gas from flowing opposite the downstream gas flow direction.

The means for guiding gas preferentially in a downstream gas flow direction comprises: directionally oriented inlet holes in the transverse member directing input gas into the transvers member in the downstream gas flow direction; and directionally inclined partitions inside the transverse member directing the input gas in the downstream gas flow direction.

A first flow resistance for gas introduced to the transverse member in the downstream gas flow direction may be less than a second flow resistance for gas introduced to the transverse member opposite the downstream gas flow direction.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
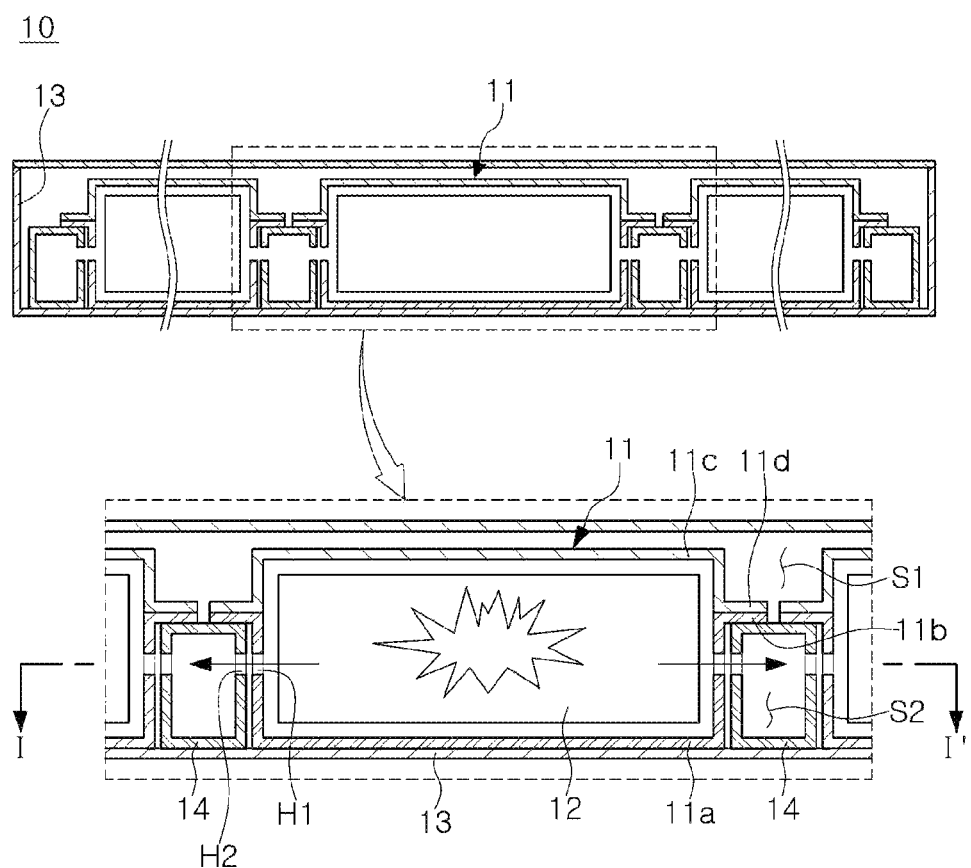
FIG. 1 is a longitudinal cross-sectional view of a battery pack according to the conventional practice.
Figure 2:
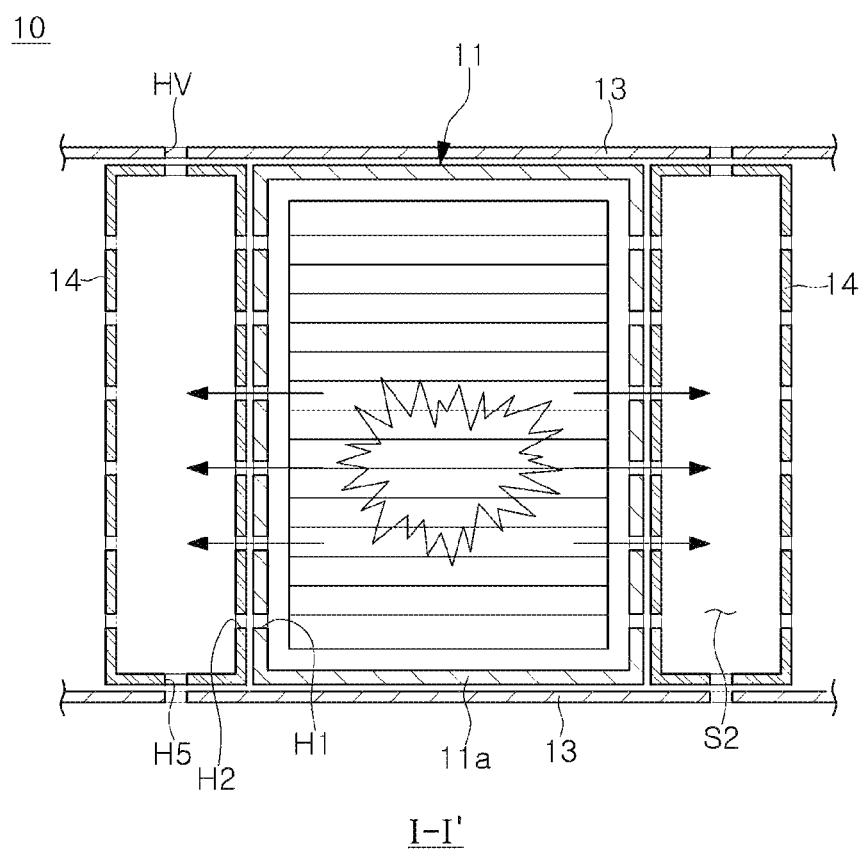
FIG. 2 is a transverse cross-sectional view of FIG. 1, taken along line I-I'.

Detailed description of the present disclosure, terms or words used in the specification and claims, described below, should not be construed as being only limited to their ordinary or dictionary meanings. The terms or words should be interpreted consistent with the technical aspects of the present disclosure. Therefore, it should be understood that, since embodiments described in the specification and configurations illustrated in the drawings may be preferred embodiments of the present disclosure, and do not represent all the technical aspects of the present disclosure, a person of ordinary skill in the art would understood there to be various equivalents and variations for the present disclosure.

Hereinafter, various embodiments of the present disclosure will be described in detail with reference to the accompanying drawings. In this case, it should be noted that the same components in the accompanying drawings may be denoted by the same reference numerals as much as possible. In addition, detailed descriptions of well-known functions and configurations that may be omitted. For the same reason, some components may be exaggerated, omitted, or schematically illustrated in the accompanying drawings, and a size of each of the components does not necessarily reflect an actual size thereof.

A battery pack 100 showing various embodiments of the present disclosure is described below with reference to FIGS. 3 to 10.

Figure 3:
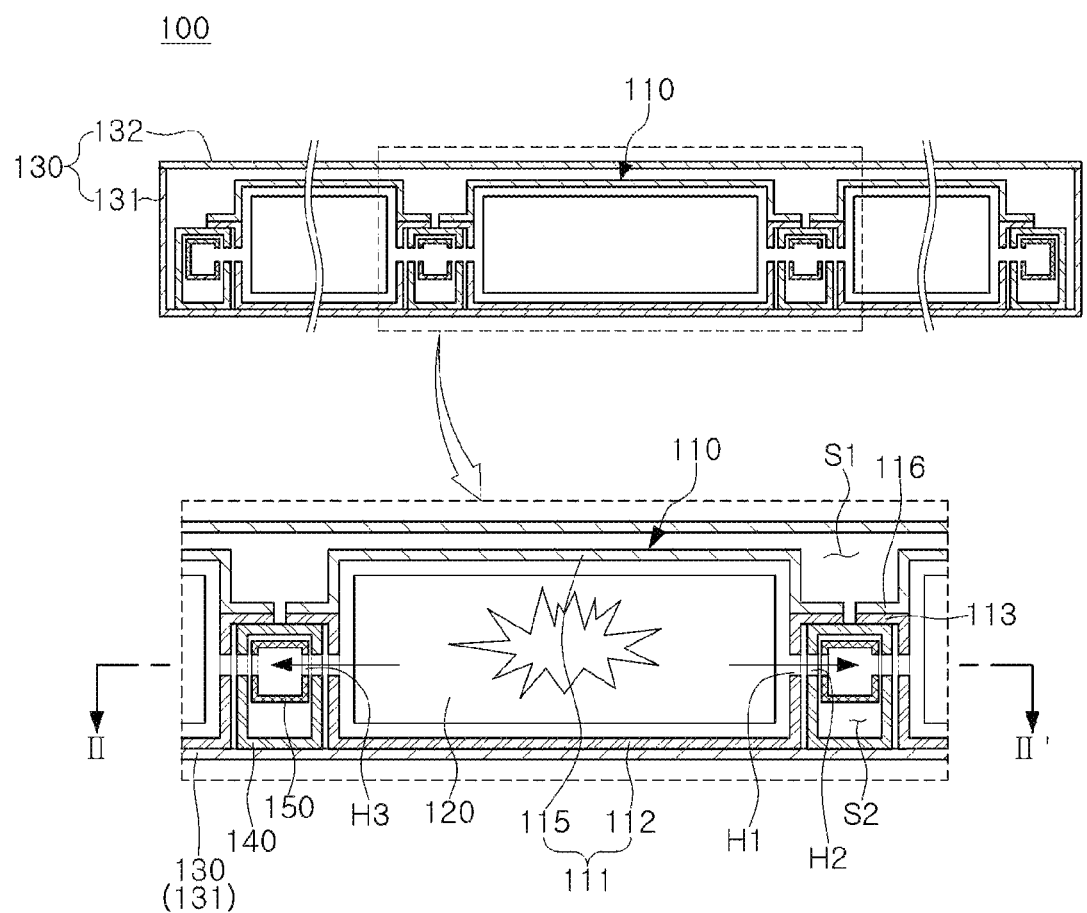
FIG. 3 is a longitudinal cross-sectional view of a battery pack according to one embodiment of the present disclosure.
Figure 4:
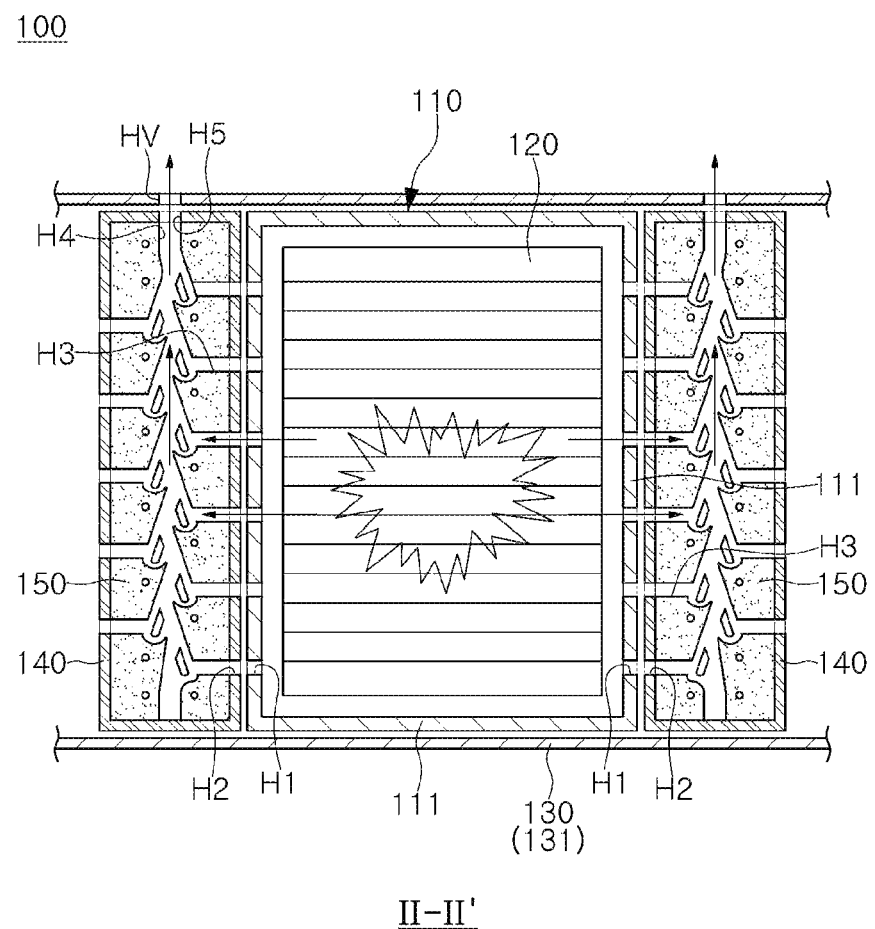
FIG. 4 is a transverse cross-sectional view of FIG. 3, taken along the line II-II'.
Figure 5A:
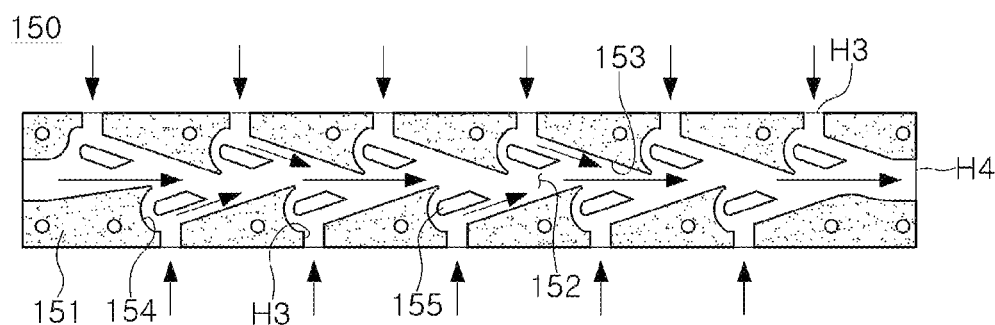
FIG. 5A illustrates the flow guide member of FIG. 4.
Figure 5B:
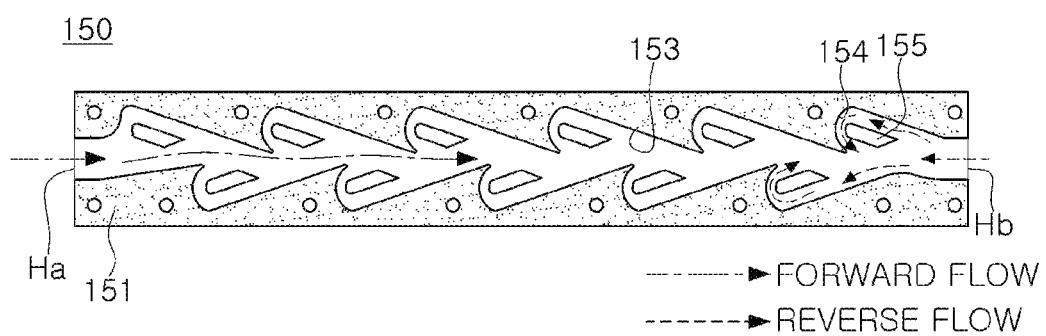
FIG. 5B is a cross-sectional view illustrating flow of the flow guide member of FIG. 5A.
Figure 6A:
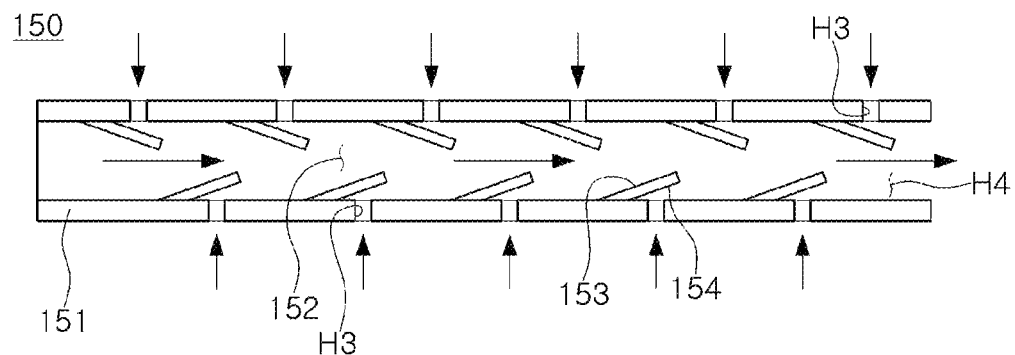
FIGS. 6A and 6B are cross-sectional views illustrating modified examples of a flow guide member according to another embodiment of the present disclosure.
Figure 6B:
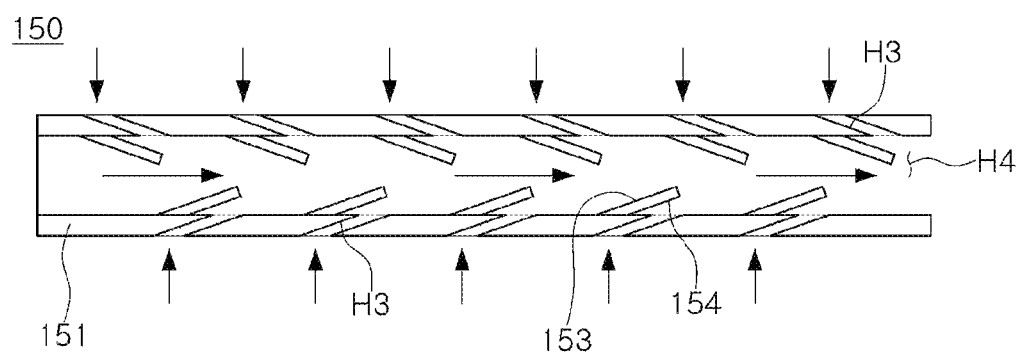
Figure 7:
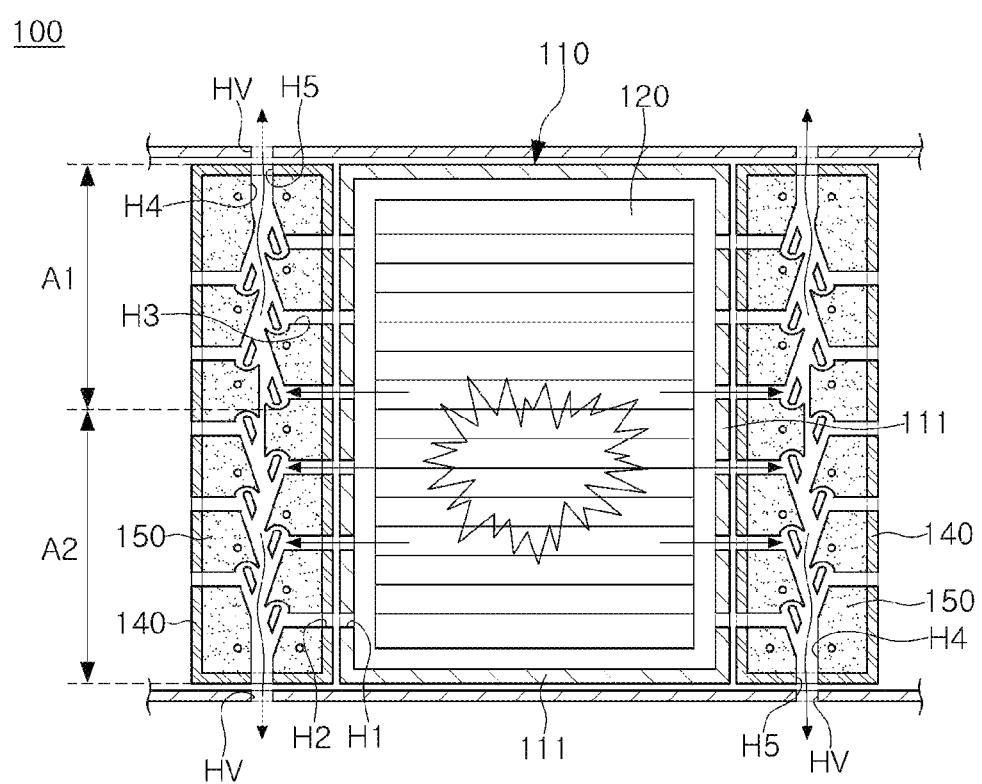
FIG. 7 is a cross-sectional view illustrating a modified example of the battery pack of FIG. 4.
Figure 8A:
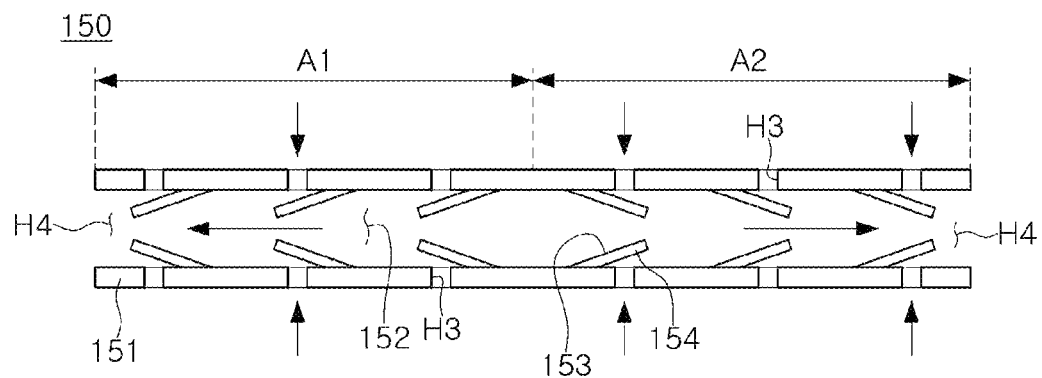
FIGS. 8A and 8B are cross-sectional views illustrating modified examples of the flow guide member of FIG. 7.
Figure 8B:
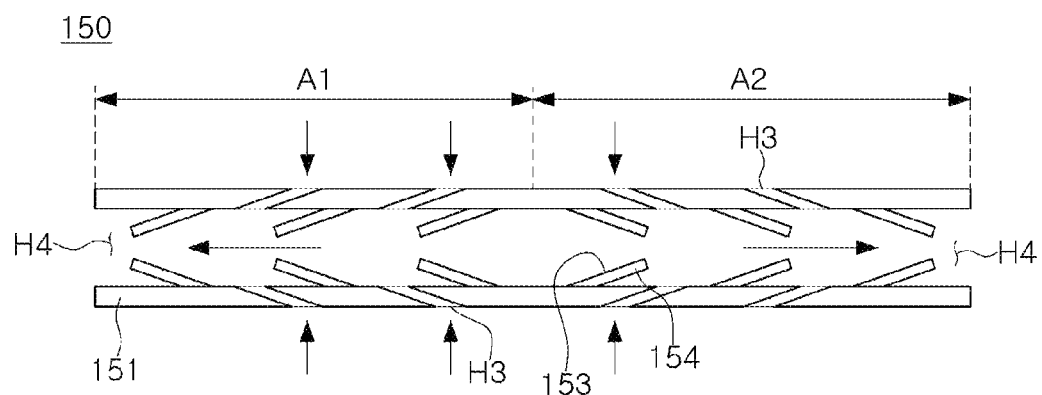
Figure 9:
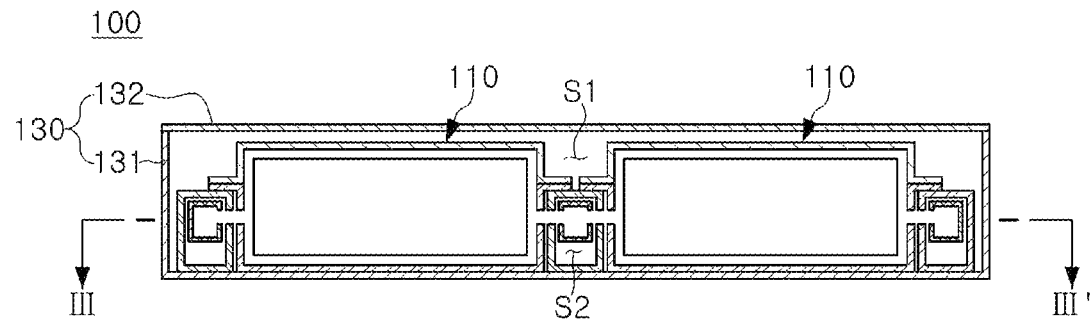
FIG. 9 is a cross-sectional view illustrating a modified example of the battery pack of FIG. 3.
Figure 10:
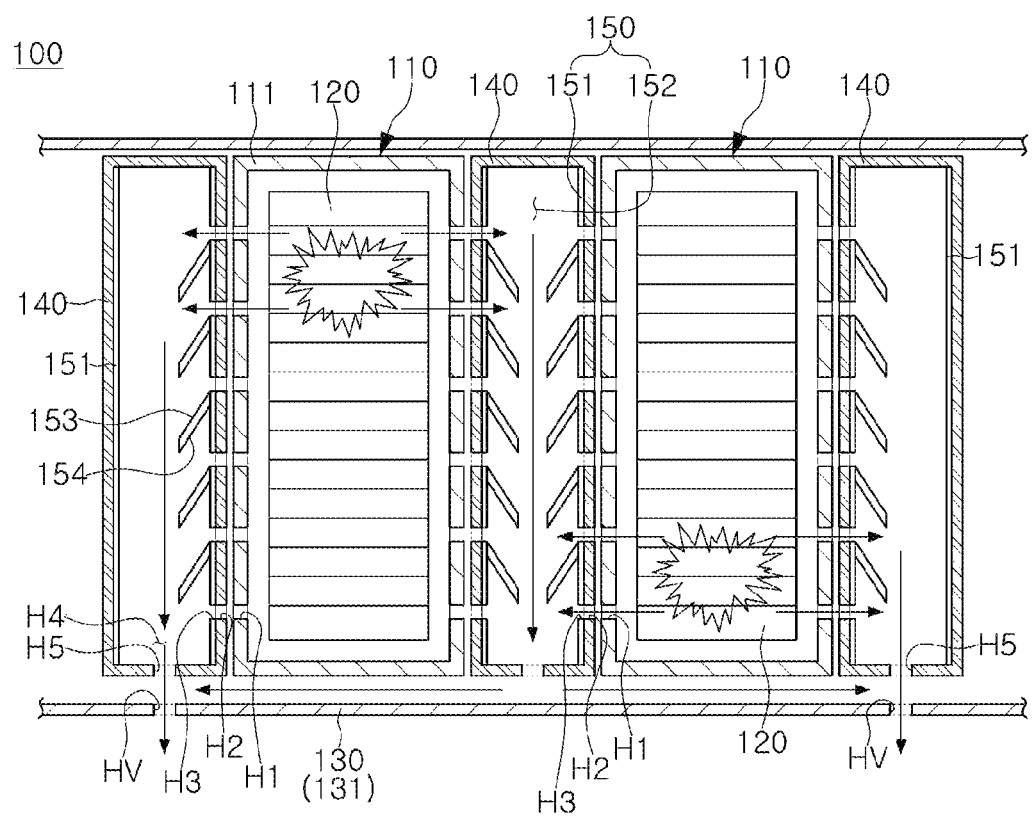
FIG. 10 is a cross-sectional view of FIG. 9, taken along line III-III'.

FIG. 3 is a longitudinal cross-sectional view of a battery pack 100 according to one embodiment of the present disclosure, FIG. 4 is a transverse cross-sectional view of FIG. 3, taken along the line II-II', FIG. 5A illustrates the flow guide member 150 of FIG. 4, FIG. 5B is a cross-sectional view illustrating flow of the flow guide member 150 of FIG. 5A, and FIGS. 6A and 6B are cross-sectional views illustrating modified examples of a flow guide member 150 according to another embodiment of the present disclosure. In addition, FIG. 7 is a cross-sectional view illustrating a modified example of the battery pack 100 of FIG. 4, FIGS. 8A and 8B are cross-sectional views illustrating modified examples of the flow guide member 150 of FIG. 7, FIG. 9 is a cross-sectional view illustrating a modified example of the battery pack 100 of FIG. 3, and FIG. 10 is a cross-sectional view of FIG. 9, taken along line III-III'.

A battery pack 100 according to one embodiment of the present disclosure may be configured to include a battery module 110 including a battery cell 120, a pack housing 130 accommodating the battery module 110, a transverse member 140 provided in the pack housing 130, and a flow guide member 150 provided in the transverse member 140.

[Battery Module 110]

A battery module 110 may include a module housing 111 and a plurality of battery cells 120 accommodated in the module housing 111. The battery module 110 may form a modular structure in which the plurality of battery cells 120 are electrically connected to each other.

In the module housing 111, a lower housing 112 and an upper housing 115 may be combined to form a space accommodating the battery cells 120. In addition, the module housing 111 may include extension portions 113 and 116 extending toward a transverse member 140, to be supported by an upper surface of the transverse member 140, as will be described later. In this case, the lower housing 112 may be provided with a first extension portion 113, and the upper housing 115 may be provided with a second extension portion 116, to have a structure in which the extension portions 113 and 116 of the module housing 111 are stably supported by the transverse member 140.

In addition, a plurality of module unit discharge holes H1 may be formed in the module housing 111 to discharge gas generated in the module housing 111 externally.

In addition, the battery cell 120 may be configured as a pouch-type secondary battery. The pouch-type secondary battery may accommodate an electrode assembly and an electrolyte solution in a pouch-type casing, and may have a form in which at least a portion of the casing is sealed. As an example, in one embodiment of the present disclosure, the pouch-type battery cell 120 may be formed as a lithium ion (Li-ion) battery or a nickel metal hydride (Ni-MH) battery, capable of charging and discharging electricity. In one embodiment of the present disclosure, the battery cell 120 is not limited to a pouch-type secondary battery, and may be configured as a can-type battery cell 120 having a prismatic or cylindrical shape with rigidity.

[Pack Housing 130]

An internal space S1 of a predetermined size may be formed in a pack housing 130, and a plurality of battery modules 110 may be installed in the internal space S1. The plurality of battery modules 110 may form a structure electrically connected to each other in the pack housing 130.

The pack housing 130 may have a structure in which a lower housing 131 and an upper housing 132 are combined to form an internal space S1 therebetween. In addition, at least one of the lower housing 131 and the upper housing 132 may have at least one venting hole HV (as shown in FIG. 4) for discharging gas generated in the internal space S1 of the pack housing 130 externally. For example, a plurality of venting holes HV may be formed in the lower housing 131. The venting hole HV may be formed in a position corresponding to an end portion of a transverse member 140 in a longitudinal direction thereof.

A battery control system (BMS) for controlling the battery module 110 may be provided in the pack housing 130.

[Transverse Member 140]

A transverse member 140 may be installed in a pack housing 130. The transverse member 140 may have a structure disposed in a direction, intersecting an internal space of the pack housing 130. For example, the transverse member 140 may be disposed to cross the internal space of the pack housing. The transverse member 140 may function as a cross member. The transverse member 140 may supplement the rigidity of the pack housing 130 and support the module housing 111 of battery module 110. The transverse member 140 may have an internal space S2 of a predetermined size. The transverse member 140 may have a closed cross-section to form the internal space S2, as illustrated in FIG. 3. The transverse member 140 is not limited to a closed cross-sectional structure, and may have a structure in which a lower portion thereof is open in a downward direction. For example, the transverse member 140 may have a structure in which the internal space S2 is formed between an upper surface of the pack housing 130 and the transverse member. In addition, the transverse member 140 may have a structure in which the internal space is formed between a side wall of the pack housing and the transverse member. In addition, the transverse member may be integrally formed with the side wall of the pack housing.

A transverse portion connection hole H2 corresponding to (e.g., aligned with) a module unit discharge hole H1 may be formed in the transversal member 140, to introduce gas generated in the module housing 111. In addition, a transverse portion discharge hole H5 may be provided in an end portion of the transverse member 140 in a longitudinal direction thereof, to discharge the gas to an external space of the transverse member 140, as illustrated in FIG. 4. For example, the transverse member 140 may have a shape in which longitudinal direction both ends corresponding to an inner side surface of the pack housing 130 are blocked. In this case, the transverse member 140 may have the transverse portion discharge hole H5 formed on at least one of both ends of the transverse member 140. In addition, the transverse member 140 may have a structure in which at least one of both end portions corresponding to the inner side surface of the pack housing 130 is open. In this case, the open end portion may function as the transverse portion discharge hole H5.

In addition, the transverse portion discharge hole H5 may be formed in a position corresponding to (e.g., aligned with) a venting hole HV, to discharge gas discharged from the transverse portion discharge hole H5 through the venting hole HV.

The transverse member 140 may have a structure spaced apart from the inner surface of the pack housing 130, as illustrated in FIG. 4. The transverse member 140 is not limited to the structure described above, and at least one of both side portions corresponding to the inner surface of the pack housing 130 may be configured to contact the inner surface of the pack housing 130.

[Flow Guide Member 150]

A flow guide member 150 may be disposed in an internal space S2 of a transverse member 140 in a longitudinal direction of the transverse member 140. The flow guide member 150 may guide flow of gas introduced from a transverse portion connection hole H2 formed in the transverse member 140, to form a gas flow with directionality in the longitudinal direction of the transverse member 140.

In the flow guide member 150, a flow portion inlet hole H3 corresponding to (e.g., aligned with) the transverse portion connection hole H2 may be formed, and a flow portion discharge hole H4 corresponding to (e.g., aligned with) a venting hole HV may be formed.

Therefore, electrolyte gas generated in a module housing 111 or gas generated by flame may be passed through the module portion discharge hole H1 of the module housing 111, the transverse portion connection hole H2 of the transverse member 140, the flow portion inlet hole H3 and the flow portion discharge hole H4 of the flow guide member 150, the transverse portion discharge hole H5 of the transverse member 140, and the venting hole HV, to be discharged out of the battery pack 100 into ambient.

In reference to FIG. 5B, the flow guide member 150 may be configured such that a first flow resistance for gas introduced from the flow portion inlet hole H3 in a first direction (forward direction) from one portion of the flow guide member 150 toward the other portion of the flow guide member 150 is less than a second flow resistance for gas introduced from the flow portion inlet hole H3 in a second direction (reverse direction) opposite to the first direction from the other portion of the flow guide member toward the one portion of the flow guide member 150. Therefore, the gas flowing through the flow guide member 150 may flow with directionality. As an example, the flow guide member 150 may include a structure of a Tesla valve disclosed in U.S. Pat. No. 1,329,559 (the entire contents of which are incorporated herein by reference).

Referring to FIGS. 4 to 6B, the flow guide member 150 may guide flow of gas introduced from the flow portion inlet hole H3, to form a gas flow with directionality in one direction facing the flow portion discharge hole H4. Referring to FIG. 5A, the flow portion discharge hole H4 may be formed at one end of the flow guide member 150 in a longitudinal direction thereof.

Referring to FIG. 5B, the flow guide member 150 may have a shape in which a forward flow (a first direction flow) is possible but a reverse flow (a second direction flow) has more resistance than the forward flow. For example, when fluid flows in a forward direction from a first opening Ha toward a second opening Hb, the fluid may flow along a flow guide portion 153 inclined in a body 151, to have a small or no flow resistance. Therefore, in the forward flow, fluid may be guided in one direction (the first direction) through a flow path in a central portion, to be discharged therefrom. When fluid flows in a reverse direction (the second direction) from the second opening Hb toward the first opening Ha, the fluid may flow into a flow obstruction portion 154 by way of a partition wall 155. In the flow obstruction portion 154, a flow (a reverse flow) in an opposite direction to the flow direction (opposite to the forward direction) and/or a vortex may be generated. Due to this, in the reverse flow, flow resistance may increase, and the fluid flow may be restricted in a direction of the first opening Ha. As such, the fluid flowing through the flow guide member 150 may flow with directionality in the forward direction, because the reverse flow may be limited.

This flow structure may be applied even when the flow portion inlet hole H3 is formed in a width direction of the flow guide member 150, as illustrated in FIG. 5A. For example, the flow guide member 150, illustrated in FIG. 5A, may guide gas introduced into the flow portion inlet hole H3, to form a gas flow with directionality in a direction from the depicted left side to the depicted right side toward the flow portion discharge hole H4 formed on the right side.

In the flow guide member 150 illustrated in FIG. 5A, a main flow path 152 may be formed in a central portion of the body 151. The flow guide member 150 may guide gas to the central portion, when the gas flows in the forward (first) direction from one portion to the other portion of the flow guide member 150, to form a gas flow through the main flow path 152. As an example, the flow guide portion 153 may have a shape as shown in FIG. 5A inclined toward a center side with respect to the flow direction. The flow obstruction portion 154 may prevent or restrict gas from flowing in a reverse (second) direction from another portion of the flow guide member to the one portion of the flow guide member 150. Thus, the flow obstruction portion 154 may generate a flow (a reverse flow) in an opposite direction to the flow direction (forward direction) and/or a vortex (such as the vortex illustrated in FIG. 5B), to obstruct the flow of gas. The flow guide member 150 may further include a partition wall 155. The partition wall 155 may guide gas flowing in the forward (first) direction from one portion of the flow guide member 150 toward another portion of the flow guide member 150, into main flow path 152. The partition wall 155 may guide the gas flowing in the reverse (second) direction from the other portion of the flow guide member 150 toward the one portion of the flow guide member 150, toward the flow obstruction portion 154. The flow portion inlet hole H3 may be formed as a plurality of flow portion inlet holes H3

(as shown in FIG. 5A) in a width direction of the flow guide member 150. Therefore, gas introduced into the flow portion inlet hole H3 may be guided by the partition wall 155 and the flow guide portion 153, and may be discharged through the flow portion discharge hole H4 through the main flow path 152 in the central portion.

Referring to FIGS. 6A and 6B, in another embodiment of the present disclosure, a main flow path 152 may be formed in a central portion of a body 151 in a flow guide member 150. The flow guide member 150 may include a flow guide portion 153 inclined toward a center side in a gas flow direction, to guide gas to the central portion, when the gas flows in the forward (first) direction from one portion of the flow guide member 150 toward another downstream portion of the flow guide member 150, to form a gas flow through the main flow path 152. In this case, when the gas flows in the forward (first) direction, one side surface of the flow guide portion 153 may serve to guide the flow of the gas to the central portion. When the gas flows in the reverse (second) direction from the other portion of the flow guide member 150 toward the one portion of the flow guide member 150, the other side surface of the flow guide portion 153 may function as a flow obstruction portion 154 for preventing or restricting the flow of the gas. A flow portion inlet hole H3 may be formed as a plurality of flow portion inlet holes H3 in a width direction of the flow guide member 150. Therefore, gas introduced into the flow portion inlet hole H3 may be guided by the flow guide portion 153, and may be discharged through a flow portion discharge hole H4 through a main flow path 152 in the central portion.

In addition, the flow portion inlet hole H3 may be formed to be perpendicular to a longitudinal direction of the flow guide member 150, as illustrated in FIG. 6A. In order to increase directionality to face the flow portion discharge hole H4, as illustrated in FIG. 6B, the flow portion inlet hole H3 may be inclined from one direction of the flow guide member 150 to another downstream portion of the flow guide member 150.

Referring to FIG. 7 and FIGS. 8A and 8B, a flow guide member 150 may be configured to guide flow of gas introduced from a flow portion inlet hole H3, to form a gas flow with directionality in both directions toward flow portion discharge holes H4 at opposite ends of the flow guide member 150. The flow portion discharge holes H4 may be formed at both ends of the flow guide member 150 in a longitudinal direction thereof. In this case, the gas introduced from the flow portion inlet hole H3 may be discharged through at least one of the flow portion discharge holes H4 respectively formed at both ends of the flow guide member 150 in the longitudinal direction.

For example, one side portion A1 of the flow guide member 150 in a longitudinal direction thereof, may guide flow of the gas introduced from the flow portion inlet hole H3, to form a gas flow with directionality in a direction, facing the flow portion discharge hole H4 formed at one end (e.g., the depicted left end in FIG. 8A) of the flow guide member 150 in the longitudinal direction. The other side portion A2 of the flow guide member 150 in the longitudinal direction, may guide flow of the gas introduced from the flow portion inlet hole H3, to form a gas flow with directionality in a direction, facing the flow portion discharge hole H4 formed at the other end (e.g., the depicted right end in FIG. 8A) of the flow guide member 150 in the longitudinal direction.

The flow guide member 150 illustrated in FIG. 7 may correspond to the flow guide member 150 illustrated in FIG. 5A. The flow guide member 150 illustrated in FIG. 7 may be different from the flow guide member 150 illustrated in FIG. 5A only in view that a flow guide portion 153, a flow obstruction portion 154, and a partition wall 155 have a symmetrical shape, based on a center in a longitudinal direction (i.e., the flow guide member 150 illustrated in FIG. 7 guides flow of the gas in two directions while the flow guide member 150 illustrated in FIG. 5A guides flow of the gas in only one direction).

Therefore, gas introduced from the flow portion inlet hole H3 formed at one side portion A1 of the flow guide member 150 in a longitudinal direction thereof, may be discharged with directionality in a direction, facing the flow portion discharge hole H4 formed at one end of the flow guide member 150 in the longitudinal direction. In addition, the gas introduced from the flow portion inlet hole H3 formed at the other side portion A2 in the longitudinal direction, may be discharged with directionality in a direction, facing the flow portion discharge hole H4 formed at the other end of the flow guide member 150 in the longitudinal direction. Configurations and functions of the flow guide portion 153, the flow obstruction portion 154, and the partition wall 155 may be the same as the flow guide member 150 illustrated in FIG. 5A, and will thus be omitted to avoid unnecessary duplication.

In addition, the flow guide member 150 illustrated in FIGS. 8A and 8B may correspond to the flow guide member 150 illustrated in FIGS. 6A and 6B, respectively. The flow guide member 150 illustrated in FIGS. 8A and 8B may be different from the flow guide member 150 illustrated in FIGS. 6A and 6B, respectively, only in view that that the flow guide portion 153 and the flow obstruction portion 154 have a symmetrical shape based on a center in a longitudinal direction. Therefore, gas introduced from the flow portion inlet hole H3 formed at one side portion A1 of the flow guide member 150 may be discharged with directionality in a direction, facing the flow portion discharge hole H4 formed at one end of the flow guide member 150 in the longitudinal direction. The gas introduced from the flow portion inlet hole H3 formed at the other side portion A2 of the flow guide member 150 may be discharged with directionality in a direction, facing the flow portion discharge hole H4 formed at the other end of the flow guide member 150 in the longitudinal direction. Configurations and functions of the flow guide portion 153, the flow obstruction portion 154 may be the same as those of the flow guide member 150 illustrated in FIGS. 7A and 7B, and will thus be omitted to avoid unnecessary duplication.

As illustrated in FIGS. 3, 4 and FIG. 7, the battery module 110 may be respectively installed on both sides in the width direction of at least one of the transverse members 140. In this case, the transverse portion connection hole H2 may be formed on both sides in the width direction of the transverse member 140, respectively. In addition, the flow portion inlet hole H3 may be formed to correspond to the transverse portion connection hole H2.

Therefore, the flow guide member 150 disposed in an internal space S2 of the transverse member 140 may be configured such that gas generated from the battery modules 110 on both sides is introduced.

Finally, referring to FIGS. 9 and 10, electrolyte gas generated in a module housing 111 or gas generated by flame may be passed through a module portion discharge hole H1 of the module housing 111, a transverse portion connection hole H2 of a transverse member 140, a flow portion inlet hole H3 and a flow portion discharge hole H4 of a flow guide member 150, a transverse portion discharge hole H5 of the transverse member 140, and a venting hole HV, to be discharged out of a battery pack 100. In this case, gas discharged from the transverse portion discharge hole H5 may flow through a space between an outer surface of the module housing 111 and an inner surface of the pack housing 130 to be discharged through the venting hole HV, as illustrated in FIG. 10.

As such, some of the venting holes HV may not be formed in positions corresponding to (or aligned with) the transverse portion discharge holes H5, and the space between the outer surface of the module housing 111 and the inner surface of the pack housing 130 may be used as a flow path, to solve restriction on installation position of the venting hole HV.

In addition, since a battery pack 100 according to one embodiment of the present disclosure may adjust directionality of gas discharge through a flow guide member 150, the flow guide member 150 may be configured to correspond to (or be aligned with) an installation position of a venting hole HV. Therefore, a degree of design freedom such related to installation positions of the venting holes HV may increase.

According to another embodiment of the present disclosure, by guiding gas through a flow guide member to form a gas flow with directionality in a longitudinal direction of a transverse member, gas generated in a battery pack may be rapidly discharged externally into the ambient as the gas flow with directionality encounters a small resistance to flow. Therefore, one embodiment of the present disclosure may have an effect preventing or reducing a rapid increase in temperature and/or pressure in the battery pack. In addition, another embodiment of the present disclosure may have an effect in delaying thermal propagation due to the rapid discharge of the gas.

In addition, according to still another embodiment of the present disclosure, since a flow guide member may be installed in an internal space of a transverse member, a separate space for installation of the flow guide member may not be required. Therefore, space utilization for an internal space of the battery pack in this embodiment can increase.

Further, according to yet another embodiment of the present disclosure, since a direction of discharging gas may be adjusted through a flow guide member, a structure of the flow guide member may be set to correspond to (or align with) an installation position of a venting hole. Therefore, in this embodiment, an effect increasing a degree of design freedom such as the installation position of the venting hole is obtained.

While example embodiments have been illustrated and described above, it will be apparent to those skilled in the art that modifications and variations could be made without departing from the scope of the present disclosure or from the scope defined by the appended claims.

For example, the present disclosure may be implemented by deleting some components in the above-described embodiments, and each of the embodiments may be implemented in combination with each other.

What is claimed is:

1. A battery pack comprising:
   a battery module including a module housing and a plurality of battery cells accommodated in the module housing;
   a pack housing accommodating a plurality of battery modules therein and having at least one venting hole for discharging gas externally from the pack housing;
   a transverse member installed in the pack housing and disposed in a direction intersecting an internal space of the pack housing; and
   a flow guide member disposed in an internal space of the transverse member in a longitudinal direction of the transverse member, and configured to guide gas introduced from a transverse portion connection hole in the transverse member, to form a first gas flow with directionality in the longitudinal direction of the transverse member,
   wherein the flow guide member comprises a flow guide portion and a flow obstruction portion,
   the flow guide portion is configured to guide gas flowing in a first direction from one portion of the flow guide member toward another portion of the flow guide member, and to thereby flow through a main flow path, and
   the flow obstruction portion is configured to restrict gas from flowing in a second direction, opposite to the first direction, from another portion of the flow guide member toward the one portion of the flow guide member.

2. The battery pack of claim 1, wherein
   a module portion discharge hole corresponding to the transverse portion connection hole is disposed in the module housing,
   a flow portion inlet hole corresponding to the transverse portion connection hole is disposed in the flow guide member,
   a flow portion discharge hole corresponding to the at least one venting hole is disposed in the flow guide member, and
   the gas generated in the module housing is discharged to the at least one venting hole through the flow guide member.

3. The battery pack of claim 2, wherein the flow guide member is configured to guide gas introduced from the flow portion inlet hole, to form the first gas flow with directionality in one direction toward the flow portion discharge hole.

4. The battery pack of claim 3, wherein the flow portion discharge hole is disposed at one end of the flow guide member in a longitudinal direction thereof.

5. The battery pack of claim 2, wherein
   the flow portion discharge hole comprises a first flow portion discharge hole and a second flow portion discharge hole respectively formed at both opposing ends of the flow guide member in a longitudinal direction thereof,
   the flow guide member is configured to guide second gas flow introduced from the flow portion inlet hole, to form third and fourth gas flows with directionalities in both directions toward the first flow portion discharge hole and the second flow portion discharge hole, and
   the second gas flow introduced from the flow portion inlet hole is discharged through at least one of the first flow portion discharge hole and the second flow portion discharge hole.

6. The battery pack of claim 5, wherein
   one side portion of the flow guide member in the longitudinal direction is configured to guide the second gas flow introduced from the flow portion inlet hole, to form the third gas flow with directionality in a direction toward one of the first flow portion discharge hole and the second flow portion discharge hole formed at one end of the flow guide member in the longitudinal direction, and
   the other side portion of the flow guide member in the longitudinal direction is configured to guide the second gas flow introduced from the flow portion inlet hole, to form the fourth gas flow with directionality in a direction toward the other one of the first flow portion discharge hole and the second flow portion discharge hole formed at the other end of the flow guide member in the longitudinal direction thereof.

7. The battery pack of claim 2, wherein the at least one venting hole is formed in a position corresponding to an end portion of the transverse member in a longitudinal direction thereof.

8. The battery pack of claim 7, wherein a transverse portion discharge hole is disposed in a position of the transverse member corresponding to the at least one venting hole.

9. The battery pack of claim 2, wherein the flow guide portion is configured to have a first flow resistance for gas introduced from the flow portion inlet hole in the first direction,
the flow obstruction portion is configured to have a second flow resistance for gas introduced from the flow portion inlet hole in the second direction, and
the first flow resistance is less than the second flow resistance.

10. The battery pack of claim 2, wherein the main flow path is formed in a central portion of the flow guide member.

11. The battery pack of claim 10, wherein the flow guide member further comprises a partition wall, the partition wall configured to guide the gas flowing in the first direction of the flow guide member into the main flow path, and configured to guide the gas flowing in the second direction of the flow guide member into the flow obstruction portion.

12. The battery pack of claim 10, wherein the flow portion inlet hole is inclined toward the first direction.

13. The battery pack of claim 2, wherein each of the plurality of battery modules are installed on both sides in a width direction of at least one of the transverse members,
the transverse portion connection hole is respectively disposed on both sides of the transverse member in the width direction of the transverse member, and
the flow portion inlet hole corresponds to the transverse portion connection hole.

14. The battery pack of claim 1, wherein the transverse member supports the module housing.

15. The battery pack of claim 14, wherein the module housing comprises an extension portion extending toward the transverse member, the extension portion being supported by an upper surface of the transverse member.

16. A battery pack comprising:
a battery module including a module housing and a plurality of battery cells accommodated in the module housing;
a pack housing accommodating a plurality of battery modules therein and having at least one vent hole for discharging gas externally from the pack housing; and
a transverse member installed in the pack housing and disposed in a direction intersecting an internal space of the pack housing,
wherein the transverse member comprises means for guiding gas in a downstream gas flow direction inside the transverse member toward the at least one vent hole.

17. The battery pack of claim 16, wherein the means for guiding gas in a downstream gas flow direction comprises:
a flow guide portion configured to guide the gas in the downstream gas flow direction and
a flow obstruction portion restricting gas from flowing opposite the downstream gas flow direction.

18. The battery pack of claim 16, wherein the means for guiding gas in a downstream gas flow direction comprises:
at least one vortex-generating structure resisting gas from flowing opposite the downstream gas flow direction.

19. The battery pack of claim 16, wherein the means for guiding gas in a downstream gas flow direction comprises:
directionally oriented inlet holes in the transverse member directing input gas into the transvers member in the downstream gas flow direction; and
directionally inclined partitions inside the transverse member directing the input gas in the downstream gas flow direction.

20. The battery pack of claim 16, wherein a first flow resistance for gas introduced to the transverse member in the downstream gas flow direction is less than a second flow resistance for gas introduced to the transverse member opposite the downstream gas flow direction.

* * * * *